(12) United States Patent
Korpi et al.

(10) Patent No.: US 12,289,751 B2
(45) Date of Patent: Apr. 29, 2025

(54) APPARATUS, METHOD AND COMPUTER PROGRAM FOR INTERFERENCE CANCELLATION

(71) Applicant: Nokia Technologies Oy, Espoo (FI)

(72) Inventors: Dani Korpi, Helsinki (FI); Athul Prasad, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 484 days.

(21) Appl. No.: 17/641,304

(22) PCT Filed: Sep. 17, 2019

(86) PCT No.: PCT/EP2019/074791
§ 371 (c)(1),
(2) Date: Mar. 8, 2022

(87) PCT Pub. No.: WO2021/052565
PCT Pub. Date: Mar. 25, 2021

(65) Prior Publication Data
US 2022/0287050 A1  Sep. 8, 2022

(51) Int. Cl.
*H04W 72/12* (2023.01)
*H04L 5/00* (2006.01)
*H04W 72/23* (2023.01)
*H04W 72/542* (2023.01)

(52) U.S. Cl.
CPC ......... *H04W 72/542* (2023.01); *H04L 5/0035* (2013.01); *H04W 72/23* (2023.01)

(58) Field of Classification Search
CPC ............................ H04W 72/542; H04W 72/23
See application file for complete search history.

(56) References Cited

U.S. PATENT DOCUMENTS

| | | | |
|---|---|---|---|
| 2008/0095133 A1* | 4/2008 | Kodo ................ | H04W 72/20 370/342 |
| 2013/0005269 A1* | 1/2013 | Lindoff ............. | H04J 11/0026 455/63.1 |
| 2014/0029506 A1* | 1/2014 | Sahin ................ | H04W 72/541 370/336 |
| 2014/0307703 A1* | 10/2014 | Gaal ................. | H04L 5/0073 370/329 |
| 2015/0063196 A1* | 3/2015 | Nentwig ............ | H04L 1/0009 370/312 |
| 2015/0222338 A1* | 8/2015 | Zhang .............. | H04L 25/03891 375/267 |
| 2016/0301539 A1* | 10/2016 | Lindoff ............. | H04W 40/12 |

(Continued)

FOREIGN PATENT DOCUMENTS

WO    WO 2012/075031 A2    6/2012

*Primary Examiner* — Fahmida S Chowdhury
(74) *Attorney, Agent, or Firm* — McCarter & English LLP

(57) ABSTRACT

There is provided an apparatus including circuitry configured for performing: receiving radio transmission parameters for a set of base stations to transmit at least one data packet over same time-frequency physical resource blocks to the apparatus, the apparatus located in a first cell which is adjacent to a cell of at least one base station of the set of base stations; and receiving, in a data session, the at least one data packet at the apparatus; using the at least one data packet and the radio transmission parameters for interference cancellation for data signals received at the apparatus from user devices in the first cell.

20 Claims, 12 Drawing Sheets

S1: Receiving radio transmission parameters at an apparatus for a set of base stations to transmit at least one data packet over same time-frequency physical resource blocks, the apparatus located in a first cell which is adjacent to a cell of at least one base station of the set of base stations S2: Receiving, in a data session, the at least one data packet at the apparatus S3: Using the at least one data packet and the radio transmission parameters for interference cancellation for data signals received at the apparatus from user devices in the first cell

(56) References Cited

U.S. PATENT DOCUMENTS

| | | | | |
|---|---|---|---|---|
| 2016/0330758 A1* | 11/2016 | Cheng | .................. | H04L 5/0037 |
| 2017/0245160 A1* | 8/2017 | Rost | ..................... | H04W 16/24 |
| 2017/0257204 A1* | 9/2017 | Shi | ....................... | H04L 1/0035 |
| 2018/0007702 A1* | 1/2018 | Li | .......................... | H04W 4/70 |
| 2018/0367268 A1* | 12/2018 | Deng | ................. | H04W 72/563 |
| 2020/0244495 A1* | 7/2020 | Li | ........................ | H04L 27/361 |
| 2020/0329518 A1* | 10/2020 | Liu | ....................... | H04B 7/022 |
| 2021/0076370 A1* | 3/2021 | Bengtsson | ......... | H04W 72/046 |
| 2021/0127316 A1* | 4/2021 | Di Taranto | ......... | H04W 40/023 |

* cited by examiner

APPARATUS, METHOD AND COMPUTER PROGRAM FOR INTERFERENCE CANCELLATION

CROSS REFERENCE TO RELATED APPLICATION

This patent application is a U.S. National Stage application of International Patent Application Number PCT/EP2019/074791 filed Sep. 17, 2019 which is hereby incorporated by reference in its entirety.

FIELD

This disclosure relates to a communications network. More particularly, the present disclosure relates to wide-area multicast/broadcast networks.

BACKGROUND

Multicast and Broadcast networks, which come under the umbrella of Multimedia Broadcast/Multicast Service (MBMS), are useful components in both Third Generation (3G) and Fourth Generation (4G) LTE-Advanced wireless networks, for example. Multicast and Broadcast networks can be used in both 3G and 4G networks to enable resource efficient content distribution. Examples of content that may be distributed in such networks are TV broadcast content and public safety content (such as public warning systems and mission critical communication systems) in legacy broadband networks.

STATEMENT OF INVENTION

According to a first aspect there is provided an apparatus comprising means for performing: receiving radio transmission parameters for a set of base stations to transmit at least one data packet over same time-frequency physical resource blocks; the apparatus located in a first cell which is adjacent to a cell of at least one base station of the set of base stations; and receiving, in a data session, the at least one data packet at the apparatus; using the at least one data packet and the radio transmission parameters for interference cancellation for data signals received at the apparatus from user devices in the first cell.

According to some examples, the set of base stations transmit the at least one data packet as a multicast transmission.

According to some examples, the using the at least one data packet and the radio transmission parameters for interference cancellation comprises: using the at least one data packet and the radio transmission parameters to reconstruct an interfering signal in the first cell, the interfering signal caused by the at least one data packet transmitted by each base station of the set of base stations over the same time-frequency physical resource blocks; using the reconstructed interfering signal for interference cancellation for the at least one data signal transmitted to the apparatus from the at least one user device in the first cell.

According to some examples, the means are further configured to perform: sending, to a core network entity, a request to initiate the data session when a triggering criteria has been met, wherein the triggering criteria comprises at least one of: a level of interference measured by at least one user device in the first cell exceeding a threshold level of interference; a number of base stations in the set of base stations transmitting the at least one data packet over same time-frequency physical resource blocks exceeds a threshold number of base stations.

According to some examples, the core network entity comprises at least one of: a user plane function; an access and mobility management function; a session management function; and a mobility management entity.

According to some examples, the data session is initiated with the apparatus by at least one of: a user plane function; an access and mobility management function; a session management function; and a mobility management entity.

According to some examples receiving the at least one data packet and receiving the radio transmission parameters comprises at least one of: receiving, in the data session, both the at least one data packet and the radio transmission parameters from a core network for managing setup of data sessions; receiving, in the data session, the at least one data packet from the core network for managing setup of data sessions and receiving the radio transmission parameters from at least one base station of the set of base stations; or receiving, in the data session, the at least one data packet from the core network for managing setup of data sessions and receiving the radio transmission parameters from a multi-cell multicast coordinate entity.

According to some examples, the at least one data packet and the radio transmission parameters are received in a data session with a gNB-CU.

According to some examples, the at least one data packet for the set of base stations is transmitted by the set of base stations as a multicast transmission, and the radio transmission parameters for the multicast data transmission are received from a multi-cell multicast coordinate entity.

According to some examples, the radio transmission parameters are received from a base station of the set of base stations.

According to some examples, the radio transmission parameters are received from a base station of the set of base stations via an X2 interface.

According to some examples, the means are further configured to perform: configuring, as uplink resources in the first cell, physical resource blocks which are experiencing interference due to the set of base stations which are transmitting the at least one data packet over same time-frequency physical resource blocks.

According to some examples, the means are further configured to perform: terminating the data session at the apparatus.

According to some examples, the means comprises: at least one processor; and at least one memory including computer program code, the at least one memory and computer program code configured to, with the at least one processor, cause the performances of the apparatus.

According to some examples, the apparatus comprises a neighbour base station to the at least one base station of the set of base stations.

According to some examples, the apparatus comprises a base station.

According to some examples, the apparatus comprises a gNB.

According to some examples, the interference cancellation for data signals transmitted to the apparatus from user devices in the first cell comprises interference cancellation for uplink signals.

According to some examples, the data session is only for interference cancellation purposes.

According to some examples, the data session is not transmitted over the air.

According to some examples, the data session is transmitted over a wired connection between a core network and a radio access network comprising the apparatus.

According to some examples, the radio transmission parameters for the set of base stations are received from at least one of: a multi-cell coordination entity in the network; and an entity which is part of a base station of the set of base stations.

According to some examples, an entity for managing the data session comprises a session management function.

According to an example, an entity for managing the data session comprises a mobility management entity.

According to a second aspect there is provided an apparatus comprising at least one processor; and at least one memory including computer program code; the at least one memory and the computer program code configured to, with the at least one processor, cause the apparatus at least to perform: receiving radio transmission parameters for a set of base stations to transmit at least one data packet over same time-frequency physical resource blocks, the apparatus located in a first cell which is adjacent to a cell of at least one base station of the set of base stations; and receiving, in a data session, the at least one data packet at the apparatus; using the at least one data packet and the radio transmission parameters for interference cancellation for data signals received at the apparatus from user devices in the first cell.

According to some examples, the set of base stations transmit the at least one data packet as a multicast transmission.

According to some examples, the using the at least one data packet and the radio transmission parameters for interference cancellation comprises: using the at least one data packet and the radio transmission parameters to reconstruct an interfering signal in the first cell, the interfering signal caused by the at least one data packet transmitted by each base station of the set of base stations over the same time-frequency physical resource blocks; using the reconstructed interfering signal for interference cancellation for the at least one data signal transmitted to the apparatus from the at least one user device in the first cell.

According to some examples, the at least one memory and the computer program code are configured to, with the at least one processor, cause the apparatus at least to perform: sending, to a core network entity, a request to initiate the data session when a triggering criteria has been met, wherein the triggering criteria comprises at least one of: a level of interference measured by at least one user device in the first cell exceeding a threshold level of interference; a number of base stations in the set of base stations transmitting the at least one data packet over same time-frequency physical resource blocks exceeds a threshold number of base stations.

According to some examples, the core network entity comprises at least one of: a user plane function; an access and mobility management function; a session management function; and a mobility management entity.

According to some examples, the data session is initiated with the apparatus by at least one of: a user plane function; an access and mobility management function; a session management function; and a mobility management entity.

According to some examples receiving the at least one data packet and receiving the radio transmission parameters comprises at least one of: receiving, in the data session, both the at least one data packet and the radio transmission parameters from a core network for managing setup of data sessions; receiving, in the data session, the at least one data packet from the core network for managing setup of data sessions and receiving the radio transmission parameters from at least one base station of the set of base stations; or receiving, in the data session, the at least one data packet from the core network for managing setup of data sessions and receiving the radio transmission parameters from a multi-cell multicast coordinate entity.

According to some examples, the at least one data packet and the radio transmission parameters are received in a data session with a gNB-CU.

According to some examples, the at least one data packet for the set of base stations is transmitted by the set of base stations as a multicast transmission, and the radio transmission parameters for the multicast data transmission are received from a multi-cell multicast coordinate entity.

According to some examples, the radio transmission parameters are received from a base station of the set of base stations.

According to some examples, the radio transmission parameters are received from a base station of the set of base stations via an X2 interface.

According to some examples, the at least one memory and the computer program code are configured to, with the at least one processor, cause the apparatus at least to perform: configuring, as uplink resources in the first cell, physical resource blocks which are experiencing interference due to the set of base stations which are transmitting the at least one data packet over same time-frequency physical resource blocks.

According to some examples, the at least one memory and the computer program code are configured to, with the at least one processor, cause the apparatus at least to perform: terminating the data session at the apparatus.

According to some examples, the apparatus comprises a neighbour base station to the at least one base station of the set of base stations.

According to some examples, the apparatus comprises a base station.

According to some examples, the apparatus comprises a gNB.

According to some examples, the interference cancellation for data signals transmitted to the apparatus from user devices in the first cell comprises interference cancellation for uplink signals.

According to some examples, the data session is only for interference cancellation purposes.

According to some examples, the data session is not transmitted over the air.

According to some examples, the data session is transmitted over a wired connection between a core network and a radio access network comprising the apparatus.

According to some examples, the radio transmission parameters for the set of base stations are received from at least one of: a multi-cell coordination entity in the network; and an entity which is part of a base station of the set of base stations.

According to some examples, an entity for managing the data session comprises a session management function.

According to an example, an entity for managing the data session comprises a mobility management entity.

According to a third aspect there is provided an apparatus comprising: receiving circuitry for receiving radio transmission parameters for a set of base stations to transmit at least one data packet over same time-frequency physical resource blocks, the apparatus located in a first cell which is adjacent to a cell of at least one base station of the set of base stations; and receiving circuitry for receiving, in a data session, the at least one data packet at the apparatus; and using circuitry for using the at least one data packet and the radio transmission parameters for interference cancellation for data signals received at the apparatus from user devices in the first cell.

According to a fourth aspect there is provided a method comprising: receiving radio transmission parameters at an apparatus for a set of base stations to transmit at least one data packet over same time-frequency physical resource blocks, the apparatus located in a first cell which is adjacent to a cell of at least one base station of the set of base stations; and receiving, in a data session, the at least one data packet at the apparatus; and using the at least one data packet and the radio transmission parameters for interference cancellation for data signals received at the apparatus from user devices in the first cell.

According to some examples, the method comprises the set of base stations transmitting the at least one data packet as a multicast transmission.

According to some examples, the using the at least one data packet and the radio transmission parameters for interference cancellation comprises: using the at least one data packet and the radio transmission parameters to reconstruct an interfering signal in the first cell, the interfering signal caused by the at least one data packet transmitted by each base station of the set of base stations over the same time-frequency physical resource blocks; using the reconstructed interfering signal for interference cancellation for the at least one data signal transmitted to the apparatus from the at least one user device in the first cell.

According to some examples, the method comprises the apparatus sending, to a core network entity, a request to initiate the data session when a triggering criteria has been met, wherein the triggering criteria comprises at least one of: a level of interference measured by at least one user device in the first cell exceeding a threshold level of interference; a number of base stations in the set of base stations transmitting the at least one data packet over same time-frequency physical resource blocks exceeds a threshold number of base stations.

According to some examples, the core network entity comprises at least one of: a user plane function; an access and mobility management function; a session management function; and a mobility management entity.

According to some examples, the data session is initiated with the apparatus by at least one of: a user plane function; an access and mobility management function; a session management function; and a mobility management entity.

According to some examples, receiving the at least one data packet and receiving the radio transmission parameters comprises at least one of: receiving, in the data session, both the at least one data packet and the radio transmission parameters from a core network for managing setup of data sessions; receiving, in the data session, the at least one data packet from the core network for managing setup of data sessions and receiving the radio transmission parameters from at least one base station of the set of base stations; or receiving, in the data session, the at least one data packet from the core network for managing setup of data sessions and receiving the radio transmission parameters from a multi-cell multicast coordinate entity.

According to some examples, the at least one data packet and the radio transmission parameters are received in a data session with a gNB-CU.

According to some examples, the at least one data packet for the set of base stations is transmitted by the set of base stations as a multicast transmission, and the radio transmission parameters for the multicast data transmission are received from a multi-cell multicast coordinate entity.

According to some examples, the radio transmission parameters are received from a base station of the set of base stations.

According to some examples, the radio transmission parameters are received from a base station of the set of base stations via an X2 interface.

According to some examples the method comprises configuring, as uplink resources in the first cell, physical resource blocks which are experiencing interference due to the set of base stations which are transmitting the at least one data packet over same time-frequency physical resource blocks.

According to some examples the method comprises terminating the data session at the apparatus.

According to some examples, the apparatus comprises a neighbour base station to the at least one base station of the set of base stations.

According to some examples, the apparatus comprises a base station.

According to some examples, the apparatus comprises a gNB.

According to some examples, the interference cancellation for data signals transmitted to the apparatus from user devices in the first cell comprises interference cancellation for uplink signals.

According to some examples, the data session is only for interference cancellation purposes.

According to some examples, the data session is not transmitted over the air.

According to some examples, the data session is transmitted over a wired connection between a core network and a radio access network comprising the apparatus.

According to some examples, the radio transmission parameters for the set of base stations are received from at least one of: a multi-cell coordination entity in the network; and an entity which is part of a base station of the set of base stations.

According to some examples, an entity for managing the data session comprises a session management function.

According to an example, an entity for managing the data session comprises a mobility management entity.

According to a fifth aspect there is provided a computer program comprising instructions for causing an apparatus to perform at least the following: receiving radio transmission parameters at the apparatus for a set of base stations to transmit at least one data packet over same time-frequency physical resource blocks, the apparatus located in a first cell which is adjacent to a cell of at least one base station of the set of base stations; and receiving, in a data session, the at least one data packet at the apparatus; and using the at least one data packet and the radio transmission parameters for interference cancellation for data signals received at the apparatus from user devices in the first cell.

According to a sixth aspect there is provided a computer program comprising instructions stored thereon for performing at least the following: receiving radio transmission parameters at an apparatus for a set of base stations to transmit at least one data packet over same time-frequency physical resource blocks, the apparatus located in a first cell which is adjacent to a cell of at least one base station of the set of base stations; and receiving, in a data session, the at least one data packet at the apparatus; and using the at least one data packet and the radio transmission parameters for interference cancellation for data signals received at the apparatus from user devices in the first cell.

According to a seventh aspect there is provided a non-transitory computer readable medium comprising program instructions for causing an apparatus to perform at least the following: receiving radio transmission parameters at the apparatus for a set of base stations to transmit at least one data packet over same time-frequency physical resource blocks, the apparatus located in a first cell which is adjacent to a cell of at least one base station of the set of base stations; and receiving, in a data session, the at least one data packet at the apparatus; and using the at least one data packet and the radio transmission parameters for interference cancellation for data signals received at the apparatus from user devices in the first cell.

According to an eighth aspect there is provided a non-transitory computer readable medium comprising program instructions stored thereon for performing at least the following: receiving radio transmission parameters at an apparatus for a set of base stations to transmit at least one data packet over same time-frequency physical resource blocks, the apparatus located in a first cell which is adjacent to a cell of at least one base station of the set of base stations; and receiving, in a data session, the at least one data packet at the apparatus; and using the at least one data packet and the radio transmission parameters for interference cancellation for data signals received at the apparatus from user devices in the first cell.

According to a ninth aspect there is provided an apparatus comprising means for performing: transmitting, to a base station in a first cell, radio transmission parameters for a set of base stations to transmit at least one data packet over same time-frequency physical resource blocks; at least one base station of the set of base stations situated in a cell adjacent to the first cell.

According to some examples, the set of base stations transmit the at least one data packet as a multicast transmission.

According to some examples, the means are further configured to perform: receiving, from the base station in the first cell, a request to transmit the radio transmission parameters when a triggering criteria has been met, wherein the triggering criteria comprises at least one of: a level of interference measured by at least one user device in the first cell exceeding a threshold level of interference; a number of base stations in the set of base stations transmitting data signals over same time-frequency physical resource blocks exceeds a threshold number of base stations; and in response to receiving the request, the means are further configured to perform: transmitting, to the base station in the first cell, the radio transmission parameters.

According to some examples, the apparatus is a part of a core network for managing setup of data sessions; and wherein the apparatus comprises means for performing: transmitting, in a data session with the base station in the first cell, the at least one data packet; wherein transmitting the radio transmission parameters comprises transmitting the radio transmission parameters in the data session.

According to some examples, the means are further configured to perform: receiving a request to initiate the data session with the base station in the first cell when the triggering criteria have been met; initiating the data session with the base station in the first cell when the triggering criteria has been met.

According to some examples, the apparatus comprises at least one of: a user plane function; an access and mobility management function; a session management function; and a mobility management entity.

According to some examples, the at least one data packet and the radio transmission parameters of the set of base stations are configured to be used by the base station in the first cell to reconstruct an interfering signal in the first cell, the interfering signal caused by the at least one data packet transmitted by each base station of the set of base stations over the same time-frequency physical resource blocks.

According to some examples, the means are further configured to perform: configuring a data session with at least one base station of the set of base stations to configure the transmission of the at least one data packet over the same time-frequency physical resource blocks of the set of base stations.

According to some examples, the means are further configured to perform: terminating the data session at the base station in the first cell.

According to some examples, the means comprises: at least one processor; and at least one memory including computer program code, the at least one memory and computer program code configured to, with the at least one processor, cause the performances of the apparatus.

According to some examples, the apparatus comprises a base station of the set of base stations.

According to some examples, the apparatus comprises a gNB.

According to some examples, the apparatus comprises a gNB-CU.

According to some examples, the interference cancellation for data signals transmitted to the apparatus from user devices in the first cell comprises interference cancellation for uplink signals.

According to some examples, the data session is for the purpose of cancelling interference of uplink transmission in the first cell to the base station.

According to some examples, the data session is not transmitted over the air.

According to some examples, the data session is transmitted over a wired connection between the apparatus and the base station in the first cell.

According to some examples, the apparatus comprises a multi-cell coordination entity.

According to some examples, the apparatus comprises an entity which is part of a base station of the set of base stations.

According to some examples, an entity for managing the data session in which the data signal is transmitted comprises a session management function.

According to some examples, an entity for managing the data session in which the data signal is transmitted comprises a mobility management entity.

According to a tenth aspect there is provided an apparatus comprising at least one processor; and at least one memory including computer program code; the at least one memory and the computer program code configured to, with the at least one processor, cause the apparatus at least to perform: transmitting, to a base station in a first cell, radio transmission parameters for a set of base stations to transmit at least one data packet over same time-frequency physical resource blocks; at least one base station of the set of base stations situated in a cell adjacent to the first cell.

According to some examples, the set of base stations transmit the at least one data packet as a multicast transmission.

According to some examples, the at least one memory and the computer program code are configured to, with the at least one processor, cause the apparatus at least to perform: receiving, from the base station in the first cell, a request to transmit the radio transmission parameters when a triggering criteria has been met, wherein the triggering criteria comprises at least one of: a level of interference measured by at least one user device in the first cell exceeding a threshold level of interference; a number of base stations in the set of base stations transmitting data signals over same time-frequency physical resource blocks exceeds a threshold number of base stations; and in response to receiving the request, the means are further configured to perform: transmitting, to the base station in the first cell, the radio transmission parameters.

According to some examples, the apparatus is a part of a core network for managing setup of data sessions; and wherein the apparatus comprises means for performing: transmitting, in a data session with the base station in the first cell, the at least one data packet; wherein transmitting the radio transmission parameters comprises transmitting the radio transmission parameters in the data session.

According to some examples, the at least one memory and the computer program code are configured to, with the at least one processor, cause the apparatus at least to perform: receiving a request to initiate the data session with the base station in the first cell when the triggering criteria have been met; initiating the data session with the base station in the first cell when the triggering criteria has been met.

According to some examples, the apparatus comprises at least one of: a user plane function; an access and mobility management function; a session management function; and a mobility management entity.

According to some examples, the at least one data packet and the radio transmission parameters of the set of base stations are configured to be used by the base station in the first cell to reconstruct an interfering signal in the first cell, the interfering signal caused by the at least one data packet transmitted by each base station of the set of base stations over the same time-frequency physical resource blocks.

According to some examples, the at least one memory and the computer program code are configured to, with the at least one processor, cause the apparatus at least to perform: configuring a data session with at least one base station of the set of base stations to configure the transmission of the at least one data packet over the same time-frequency physical resource blocks of the set of base stations.

According to some examples, the at least one memory and the computer program code are configured to, with the at least one processor, cause the apparatus at least to perform: terminating the data session at the base station in the first cell.

According to some examples, the apparatus comprises a base station of the set of base stations.

According to some examples, the apparatus comprises a gNB.

According to some examples, the apparatus comprises a gNB-CU.

According to some examples, the interference cancellation for data signals transmitted to the apparatus from user devices in the first cell comprises interference cancellation for uplink signals.

According to some examples, the data session is for the purpose of cancelling interference of uplink transmission in the first cell to the base station.

According to some examples, the data session is not transmitted over the air.

According to some examples, the data session is transmitted over a wired connection between the apparatus and the base station in the first cell.

According to some examples, the apparatus comprises a multi-cell coordination entity.

According to some examples, the apparatus comprises an entity which is part of a base station of the set of base stations.

According to some examples, an entity for managing the data session in which the data signal is transmitted comprises a session management function.

According to some examples, an entity for managing the data session in which the data signal is transmitted comprises a mobility management entity.

According to an eleventh aspect there is provided an apparatus comprising: transmitting circuitry for transmitting, to a base station in a first cell, radio transmission parameters for a set of base stations to transmit at least one data packet over same time-frequency physical resource blocks; at least one base station of the set of base stations situated in a cell adjacent to the first cell.

According to a twelfth aspect there is provided a method comprising: transmitting, from an apparatus to a base station in a first cell, radio transmission parameters for a set of base stations to transmit at least one data packet over same time-frequency physical resource blocks; at least one base station of the set of base stations situated in a cell adjacent to the first cell.

According to some examples, the set of base stations transmit the at least one data packet as a multicast transmission.

According to some examples, the method comprises receiving, from the base station in the first cell, a request to transmit the radio transmission parameters when a triggering criteria has been met, wherein the triggering criteria comprises at least one of: a level of interference measured by at least one user device in the first cell exceeding a threshold level of interference; a number of base stations in the set of base stations transmitting data signals over same time-frequency physical resource blocks exceeds a threshold number of base stations; and in response to receiving the request, the method comprises transmitting, to the base station in the first cell, the radio transmission parameters.

According to some examples, the apparatus is a part of a core network for managing setup of data sessions; and wherein the method comprises transmitting, in a data session with the base station in the first cell, the at least one data packet; wherein transmitting the radio transmission parameters comprises transmitting the radio transmission parameters in the data session.

According to some examples, the method comprises receiving a request to initiate the data session with the base station in the first cell when the triggering criteria have been met; and initiating the data session with the base station in the first cell when the triggering criteria has been met.

According to some examples, the apparatus comprises at least one of: a user plane function; an access and mobility management function; a session management function; and a mobility management entity.

According to some examples, the at least one data packet and the radio transmission parameters of the set of base stations are configured to be used by the base station in the first cell to reconstruct an interfering signal in the first cell, the interfering signal caused by the at least one data packet transmitted by each base station of the set of base stations over the same time-frequency physical resource blocks.

According to some examples, the method comprises configuring a data session with at least one base station of the set of base stations to configure the transmission of the at least one data packet over the same time-frequency physical resource blocks of the set of base stations.

According to some examples, the method comprises terminating the data session at the base station in the first cell.

According to some examples, the apparatus comprises a base station of the set of base stations.

According to some examples, the apparatus comprises a gNB.

According to some examples, the apparatus comprises a gNB-CU.

According to some examples, the interference cancellation for data signals transmitted to the apparatus from user devices in the first cell comprises interference cancellation for uplink signals.

According to some examples, the data session is for the purpose of cancelling interference of uplink transmission in the first cell to the base station.

According to some examples, the data session is not transmitted over the air.

According to some examples, the data session is transmitted over a wired connection between the apparatus and the base station in the first cell.

According to some examples, the apparatus comprises a multi-cell coordination entity.

According to some examples, the apparatus comprises an entity which is part of a base station of the set of base stations.

According to some examples, an entity for managing the data session in which the data signal is transmitted comprises a session management function.

According to some examples, an entity for managing the data session in which the data signal is transmitted comprises a mobility management entity.

According to a thirteenth aspect there is provided a computer program comprising instructions for causing an apparatus to perform at least the following: transmitting, from the apparatus to a base station in a first cell, radio transmission parameters for a set of base stations to transmit at least one data packet over same time-frequency physical resource blocks; at least one base station of the set of base stations situated in a cell adjacent to the first cell.

According to a fourteenth aspect there is provided a computer program comprising instructions stored thereon for performing at least the following: transmitting, from an apparatus to a base station in a first cell, radio transmission parameters for a set of base stations to transmit at least one data packet over same time-frequency physical resource blocks; at least one base station of the set of base stations situated in a cell adjacent to the first cell.

According to a fifteenth aspect there is provided a non-transitory computer readable medium comprising program instructions for causing an apparatus to perform at least the following: transmitting, from the apparatus to a base station in a first cell, radio transmission parameters for a set of base stations to transmit at least one data packet over same time-frequency physical resource blocks; at least one base station of the set of base stations situated in a cell adjacent to the first cell.

According to a sixteenth aspect there is provided a non-transitory computer readable medium comprising program instructions stored thereon for performing at least the following: transmitting, from an apparatus to a base station in a first cell, radio transmission parameters for a set of base stations to transmit at least one data packet over same time-frequency physical resource blocks; at least one base station of the set of base stations situated in a cell adjacent to the first cell.

BRIEF DESCRIPTION OF FIGURES

The invention will now be described in further detail, by way of example only, with reference to the following examples and accompanying drawings, in which.

DETAILED DESCRIPTION

The present disclosure relates to wireless communications. More particularly, the present disclosure relates to wide-area multicast/broadcast networks, and in some examples to cancelling interference caused by wide-area multicast/broadcast networks.

Figure 1:
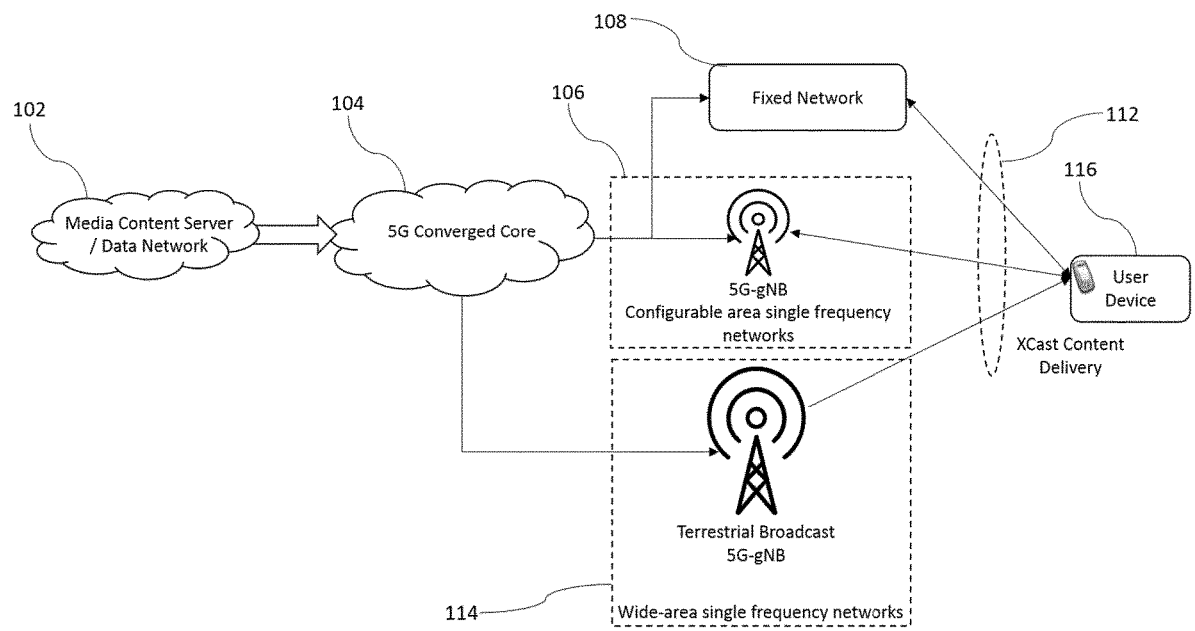
FIG. 1 shows a schematic representation of a network architecture.

An overview of a media content delivery mechanism for Fifth Generation (5G) networks in the context of a converged network is shown in FIG. 1. In FIG. 1, "Xcast content delivery", as shown at 112, indicates radio resource efficient delivery of traffic over-the-air with a mix of unicast and multicast/broadcast (MC/BC)—hence the term Xcast. The 5G architecture shown in FIG. 2B is based on the architecture in which Xcast user plane function (XUF) and control plane function (XCF) are optional network functions that can be used to replace broadcast/multicast service center (BM-SC), evolved MBMS (eMBMS) Gateway (MBMS-GW) and multicast/broadcast related functionalities within the mobility management entity (MME) of Long Term Evolution (LTE) networks.

The converged network of FIG. 1 comprises a user device (or user equipment, UE) 116 connected to a fixed network 108, as well as one or more configurable area single frequency networks 106. In some examples, the one or more configurable area single frequency networks 106 may comprise a 5G-gNB. User device 116 is also connected to a wide-area single frequency network 114. In some examples, the wide-area single frequency network may comprise a terrestrial broadcast 5G-gNB.

In the examples of FIG. 1, networks 106, 108 and 114 are connected to 5G converged core network 104. 5G converged core network 104 may be connected to a media content server/data network 102.

While the examples below are mainly described from a 5G architecture and end-to-end system perspective, the examples are also equally applicable to other types of network, for example, 4G networks. The method considers the wide or configurable area delivery of Xcast traffic, where the base stations within the radio access network (RAN) are sending coordinated transmissions using single frequency networks (SFNs).

Figure 2A:
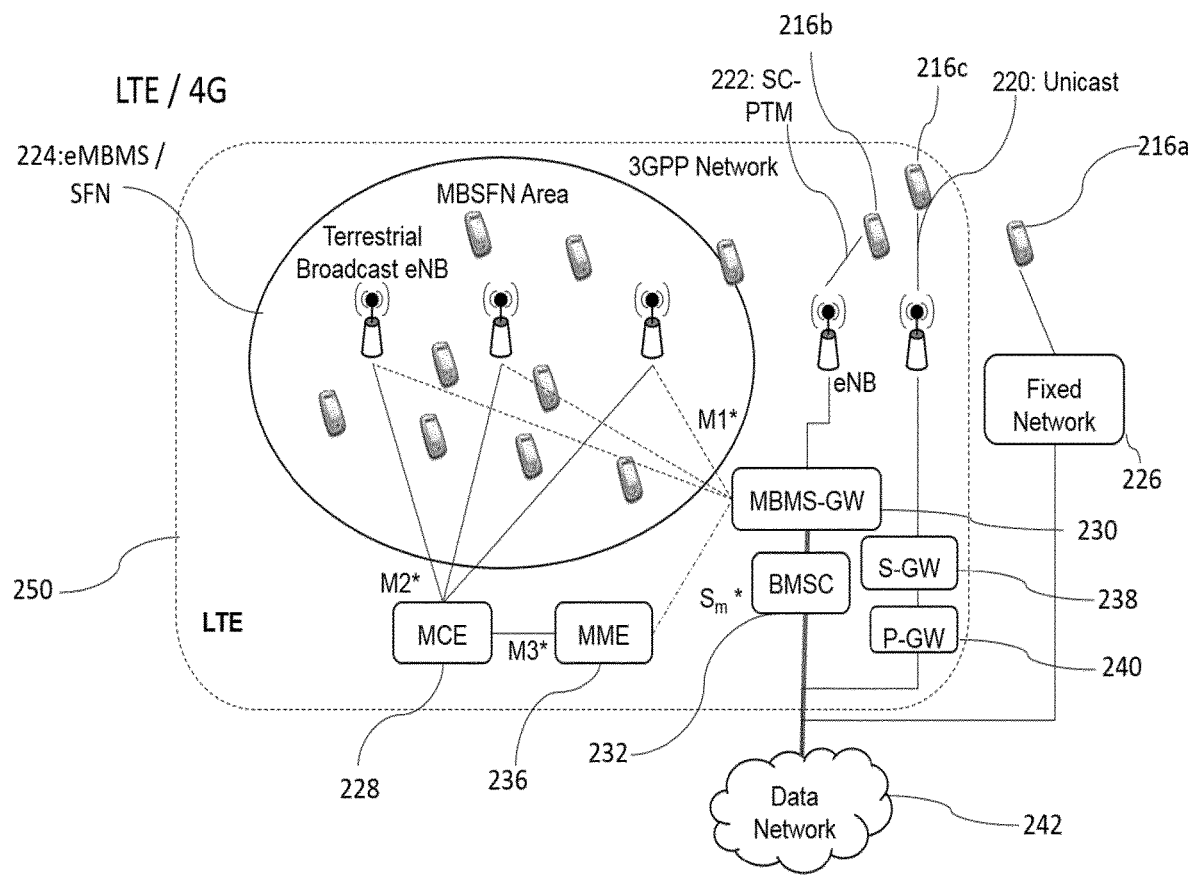
FIG. 2A shows a schematic representation of a network.
Figure 2B:
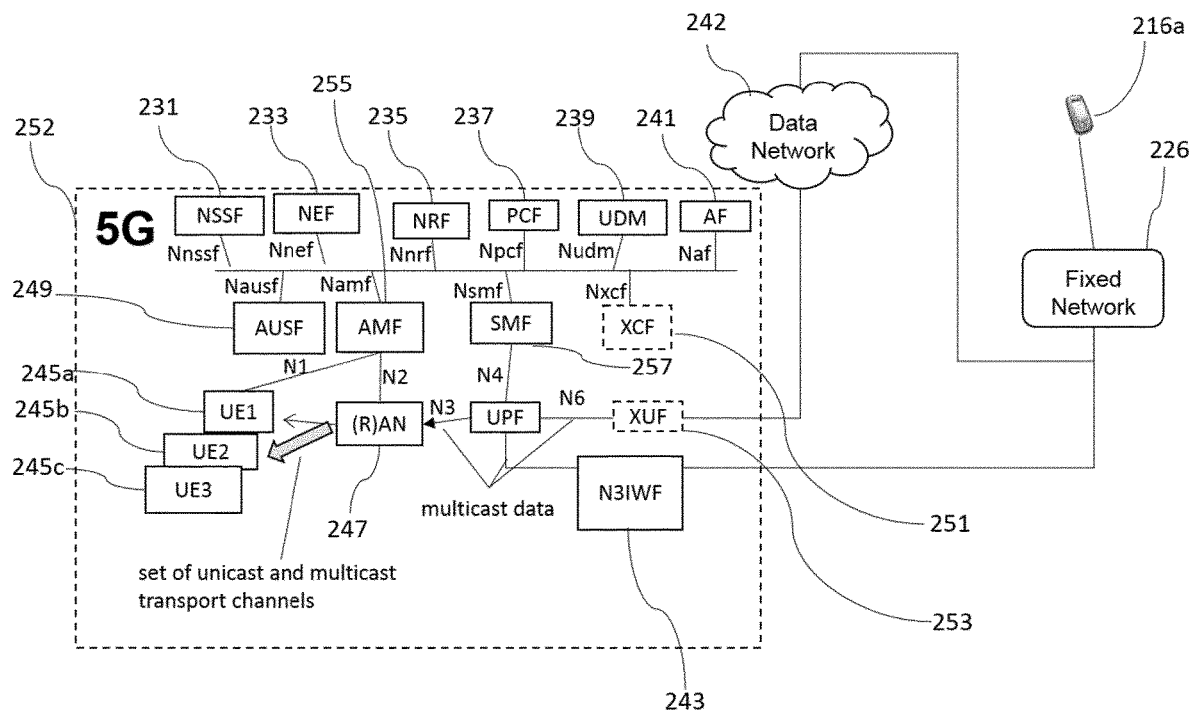
FIG. 2B shows a schematic representation of a network.

An overview of an converged Xcast system is shown in FIG. 2. FIG. 2A shows an overview of a converged Xcast network from an LTE and FIG. 2B shows an overview of a converged Xcast network from a 5G perspective.

In the example of FIG. 2A, content delivery is enabled either through a mobile network (using unicast transmissions 220 with, for example, UE 216c; single cell-point to multipoint (SC-PTM) transmissions 222 with, for example, UE 216b; or eMBMS transmissions 224) or through a fixed network 226 (with, e.g., a WiFi access point providing the last leg of connectivity towards a UE 216a). Here converged network implies efficiently interworking fixed and mobile access networks.

In the example of FIG. 2A, an LTE network 250 comprising eMBMS network 224 has been designed for traditional terrestrial broadcasting with the usage of SFN areas, which may be pre-configured statically or semi-dynamically. The multi-cell/multicast coordination entity (MCE) 228 coordinates the RAN parameter configuration operation in terms of time/frequency resources, modulation and coding schemes, etc., used for transmission. MBMS-GW 230 and Broadcast Multicast Service Center (BM-SC) 232 handle the core network operations. In the case of eMBMS there may be separate physical channels and system information configurations in order to handle the over-the-air transmissions. Single-cell point-to-multipoint (SC-PTM) enables localized MC/BC transmissions within a cell, reusing the downlink shared channel for over-the-air transmissions, as compared to larger areas being setup for SFN/eMBMS. The LTE network may also comprise MME 236, Serving Gateway (S-GW) 238 and Packet Data Network (PDN) Gateway (P-GW) 240. LTE network may be connected to a Data Network (250).

The most popular means of delivering traffic over the air has been using unicast transmissions, where traffic for each user is scheduled individually.

For 5G Xcast converged networks, such as 5G network 252 shown in FIG. 2B, a configurable area of SFNs can be used. In some examples, the configurable area is configured by a gNB-central unit (gNB-CU), where the configuration depends on the area where the dynamic Xcast traffic needs to be delivered. This implies that regions within the coverage area of the network could be configured as RAN multicast areas (RMAs)—where dynamic single frequency networks are setup by the mobile network to enable seamless connectivity for Xcast services. The UE can receive IP multicast traffic in all configured RRC states. RAN based Multicast Area (RMA) is defined for a UE joining the multicast session, e.g. IP multicast session. This RMA area can be used for the UE during both high activity and low activity. In a special case where a UE is in RRC_CONNECTED state and there are only one or few UEs receiving the multicast traffic, a UE can be configured to receive the multicast traffic over a unicast data bearer and in this case the RMA is not applied. The multicast functionality within 5G-gNB-CU (called gNB-CU-MC) can be used to enforce the synchronized Over the Air (OTA) transmission of multicast/broadcast traffic within the gNB-DUs, while obeying the Quality of Service (QoS) constraints defined for the traffic flows.

The exemplary 5G Xcast converged network of FIG. 2B comprises data network 242, fixed network 226 and UE 216a. 5G network 252 comprises first UE 245a, second UE 245b and third UE 245c. The 5G network may comprise the following entities: Network Slice Selection Function (NSSF) 231; Network Exposure Function 233; Network Repository Function 235; Policy Control Function (PCF) 237; Unified Data Management (UDM) 239; Application Function (AF) 241; Non-3GPP Inter-. Working Function (N3IWF) 243; Radio Access Network (RAN) 247; Authentication Server Function (AUSF) 249; 5G-Xcast Control Plane Network Function (XCF) 251; 5G-Xcast User Plane Network Function (XUF) 253; an Access and Mobility Management Function (AMF) 255; and Session Management Function (SMF) 257.

In some examples, an Xcast converged network may comprise a 5G network and an LTE network.

Figure 3:
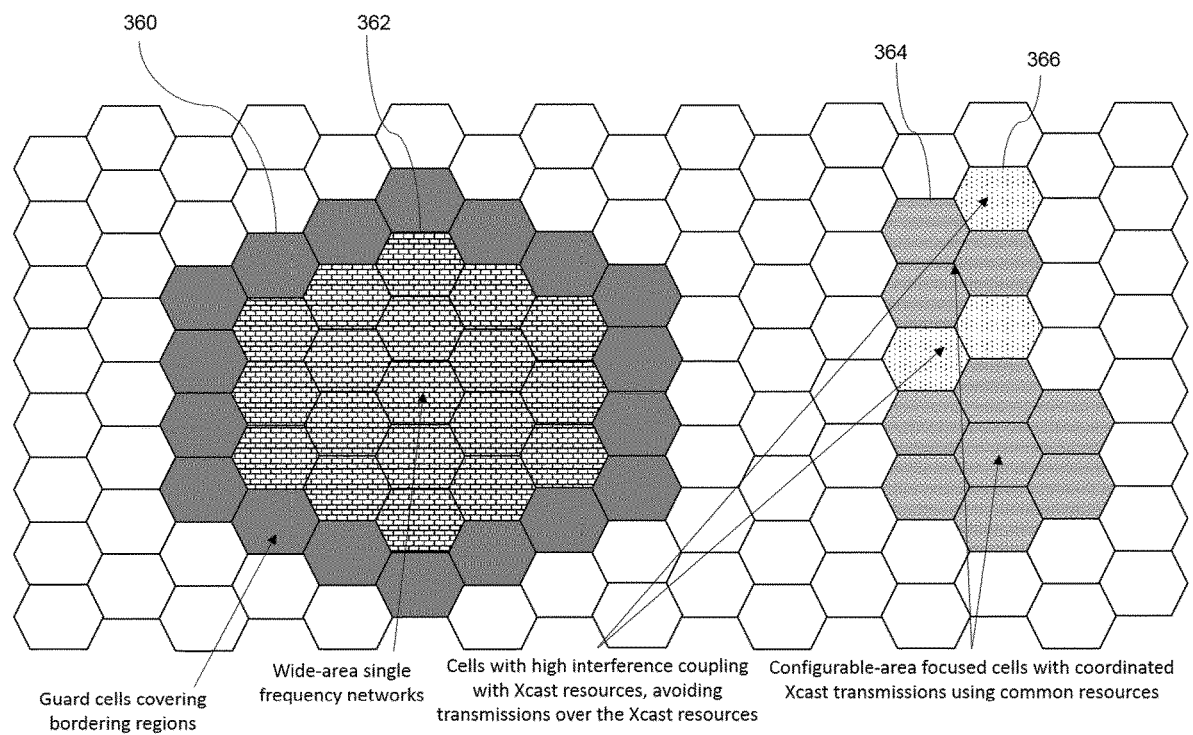
FIG. 3 shows a schematic representation of a network.

FIG. 3 shows a schematic representation of cells, where the cells are represented by hexagons.

Wide-area single frequency networks, such as the network comprising cells 362, comprise different base stations (BSs) broadcasting the same signal in a synchronized manner.

FIG. 3 also shows configurable-area cells 364 configured to operate as a SFN. These cells also broadcast the same signal in a synchronized manner.

If part of the cellular network of FIG. 3—whether as a wide-area terrestrial broadcast network comprising cells 362 or as a configurable-area mobile network comprising cells 364—has been configured to operate as an SFN, where the different base stations (BSs) broadcast the same signal in a synchronized manner, the interference in the adjacent (neighbour) cells can be an issue. This means that in some cases, the resources allocated for the SFN broadcasting in cells 362 or 364 cannot be used in the adjacent cells. Consequently, the spectral efficiency of the overall network is significantly reduced due to a required guard area around the SFN.

An examples of guard cells covering bordering regions for the wide-area terrestrial broadcast network comprising cells 362 are shown at 360. For wide-area broadcast networks a significantly large number of guard cells, due to the high transmit power of the multicast/broadcast SFN (MBSFN) transmissions is required.

In the example of FIG. 3, cells 364 perform coordinated Xcast transmissions using resources common to cells 364 and 366. For configurable-area multicast/broadcast networks, such as the network comprising cells 364, there is usually a wider dispersion of where the multicast/broadcast data would be transmitted using coordinated resources cells than there is for the wide-area broadcast network. High interference coupling with Xcast resources that are common between cells 366 and 364, such that cells 366 are required to avoid transmitting over the Xcast resources.

When each base station within the MBSFN area transmits the same signal—using the same physical resource bloc, with time and phase synchronization, and the signals propagate to another cell, each transmission may experience a different radio channel. However, the interference experienced by the UEs in a neighbouring cell is a sum of these identical signals which have gone through a different channel. The overall interference signal can therefore be significantly powerful as compared to the scenario where each of these base stations within the MBSFN area were transmitting data independently, and can contain one or more multipath echoes.

Figure 4:
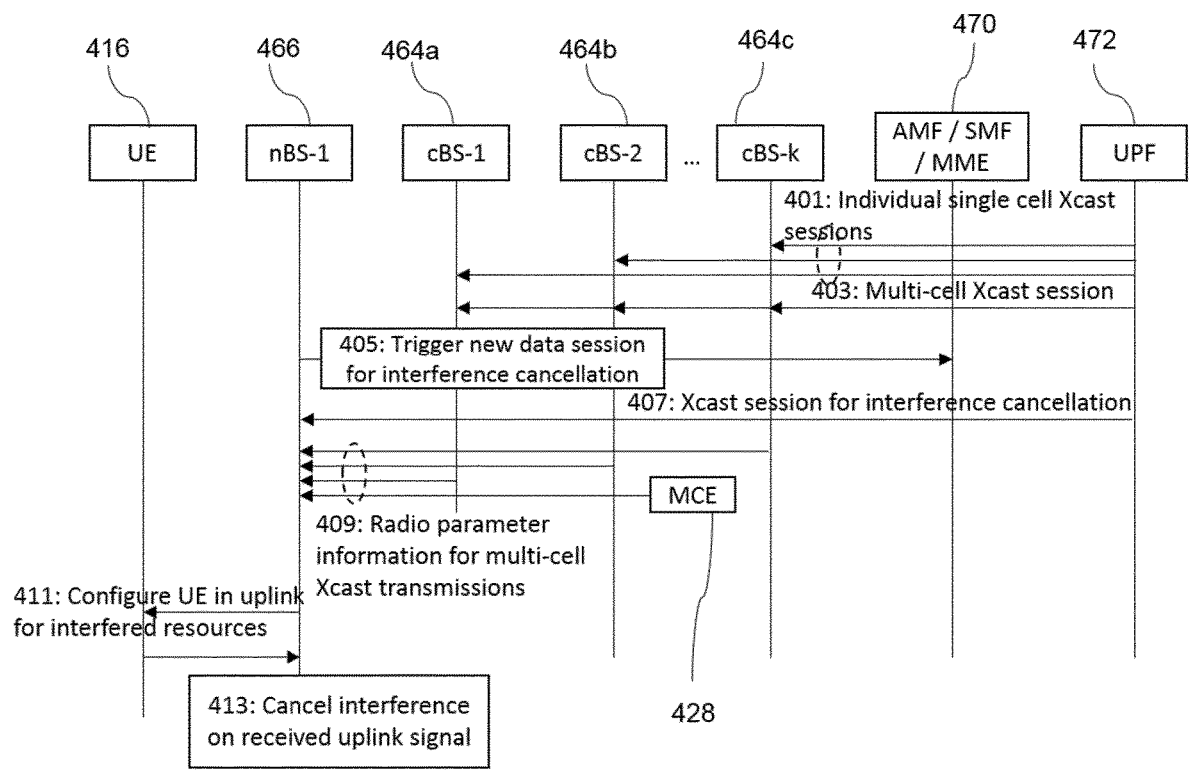
FIG. 4 shows an example of a message flow.

FIG. 4 shows a signalling diagram of an example message flow.

FIG. 4 considers a situation where k coordinating base stations (cBS) 464a, 464b and 464c change their transmission mode from single-cell Xcast transmissions (shown at 401 of FIG. 4) to multi-cell coordinated Xcast transmission (shown at 403 of FIG. 4), The multi-cell coordinated Xcast transmission uses common resources of a network comprising cBSs 464a, 464b and 464c as well as a neighbour BS (nBS) 466. nBS 466 is located in a cell adjacent to at least one of cBS 464a, 464b and 464c.

As discussed above with relation to FIG. 3, the change of transmission mode from single-cell Xcast transmissions 401 to a multi-cell coordinated Xcast transmission 403 causes significant interference to nBS 466. At 405, a trigger causes nBS 466 to trigger a new data session that is used only for interference cancellation. The new data session may be with an Access and Mobility Management Function (AMF), Session Management Function (SMF) or MME 470 of the network. The trigger criteria may comprise at least one of: the detection of a level of interference from at least one of cBS 464a, cBC 464b and cBS 464c over a threshold; and the detection of a number of base stations coordinating over a threshold. An example of a number of base stations coordinating over a threshold may be, for example, the detection of X or more cBSs coordinating together, where X is a integer number.

At 407, User Plane Function (UPF) 472 creates a data session (for example, an Xcast session) for interference cancellation with nBS 466. In some examples, AMF/SMF/MME 470 can provide information to the UPF in order to create this interference cancellation session, based on the data flow sessions that are part of the SFN transmissions that causes interference to nBS 466. In step 407, at least one data packet sent as a SFN transmission may be sent in a data session, such as an Xcast session, to nBS 466.

At 409, either an MCE 428 of the network signals the radio parameters used for multi-cell Xcast transmissions 403 to nBS 466 or at least one of cBSs 464a, 464b, 464c directly signal the radio parameters used for multi-cell Xcast transmissions to nBS 466. In some examples, both the MCE 428 and the cBSs 464a, 464b, 464c signal the radio parameters used for multi-cell Xcast transmissions 403 to nBS 466.

At 411, nBS 466 configures a UE 416 for uplink data transmission using physical resource blocks that experience interference with the multi-cell Xcast session 403. At 413, nBS 466 can use the reconstructed signal of the multi-cell Xcast transmission 403 to cancel interference.

After receiving, in the data session with UPF 472, the data packet or data packets sent as an SFN transmission by cBSs 464a, 464b, 464c at 403 and the radio parameters used for multi-cell Xcast transmissions 403, nBS 466 is able to have complete information regarding the interfered signal in a cell of nBS 466. Examples related to mechanisms used for interference cancellation are described further below.

In some examples, a dynamic transition from single-cell to multi-cell Xcast transmissions in 5G depends on the real-time data consumption patterns of the network and the user distribution in the cells undergoing the dynamic transition, and an exemplary method allows the spectral-efficient operation of the network in this scenario. In some examples, the interference cancellation data session 407 is a form of PDU session which is created without any destination UE, but is terminated within nBS 466.

Figure 5:
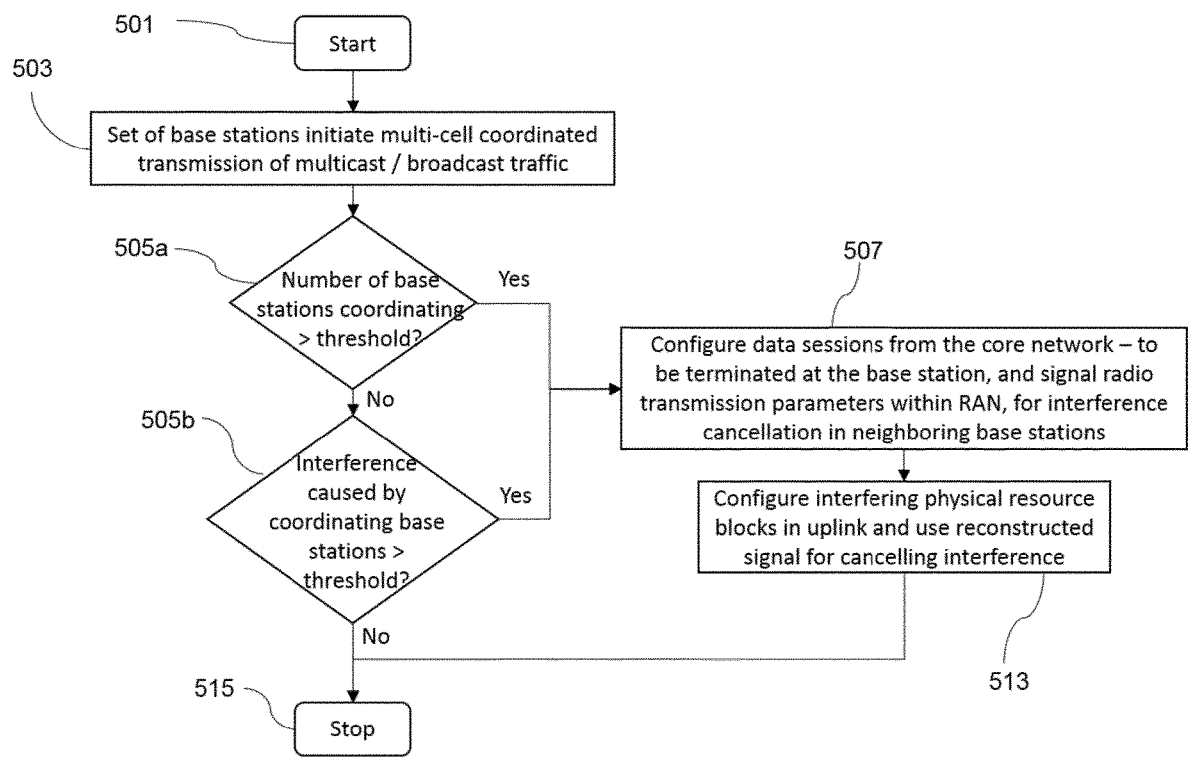
FIG. 5 shows a flow chart of a method.

FIG. 5 shows a flow chart of an example method. At 501 the method starts. At 503, a set of base stations initiate multi-cell coordinated transmission of multicast/broadcast traffic. The set of base stations may initiate a multi-cell coordinated Xcast transmission in step 503.

At 505a, a nBS to at least one of the set of base stations initiating multi-cell coordinated transmission of multicast/broadcast traffic determines whether the number of base stations coordinating in step 503 is above a threshold. The threshold may be an integer number of base stations. If the number of base stations coordinating in step 503 is above the threshold, the method proceeds to step 507. If the number of base stations coordinating in step 503 is not above the threshold, the method proceeds to step 505b.

At step 505b, the nBS determines whether the interference caused by the coordinating base stations is above a threshold value of interference. If the interference caused by the coordinating base stations is above the threshold value of interference, the method proceeds to step 507. If the interference caused by the coordinating base stations is not above the threshold value of interference, the method ends at step 515.

At step 507, the nBS configures one or more data sessions with the core network. The one or more data sessions may be terminated at the nBS. In the data session, the SFN multicast/broadcast data and the radio transmission parameters may be transmitted to the nBS. This signalling can be done over-the-air or using a backhaul connection. The nBS can use the SFN multicast/broadcast data and radio transmission parameters to reconstruct the interference signals.

Using the interfering signal, the nBS can reconstruct the interference for uplink transmissions to the nBS, for example from a UE, and can then cancel the interference. The nBS can configure physical resource blocks for uplink transmissions to the nBS, and then use the reconstructed signal for cancelling interference in the physical resource blocks, as shown at 513.

The method is applicable for cancelling interference in the UL direction towards the nBS, where the nBS is the receiver, as the interfering signal can then be provided via a wired backhaul link. In the downlink (DL) direction from the nBS, although the method could be used, the method may be less optimal as providing the interfering signal to the UEs via wireless connection, would imply signalling the complete data from the interfering SFN transmissions to the UEs which would consume significant amount of radio resources, while providing limited benefits.

The method of FIG. 5 may be performed by more than one nBS.

In some examples, the method of FIG. 5 allows the use of the SFN resources in the adjacent cells (nBSs) for uplink operation by performing interference cancellation through data coordination between cells with coordinated/single frequency transmissions and neighbouring interference victim cells.

Figure 6:
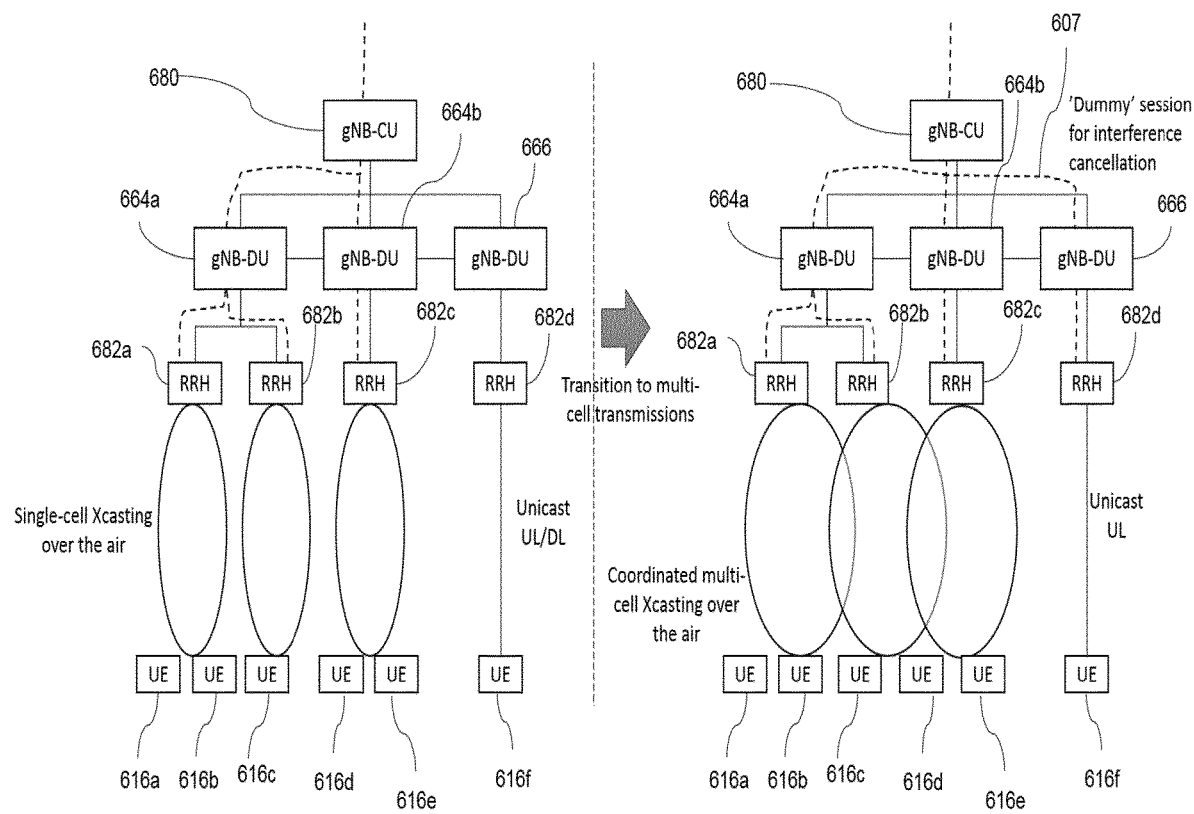
FIG. 6 shows an example of a network in two scenarios.

FIG. 6 shows an example implementation of the method in a centralized deployment scenario. In the exemplary centralized deployment scenario, different gNB-distributed units (gNB-DUs) 664a, 664b and 666 are connected to a gNB-central unit (gNB-CU) 680. A subset of these DUs (in the example of FIGS. 6, 664a and 664b) are initially using single-cell Xcast transmission, where the over-the-air transmission mode is determined based on the radio channel conditions of each connected UE 616a, 616b, 616c, 616d and 616e receiving the traffic. gNB-DUs may transmit signals through Remote Radio Heads (RRHs). In the example of FIG. 6, gNB-DU 664a transmits signals through RRHs 682a and 682b; gNB-DU 664b transmits signals through RRH 682c; and gNB-DU 666 transmits signals through RRH 682d. However, it shall be understood that other RRH configurations are possible.

Based on changes in traffic density, spectral efficiency improvements, etc., the subset of DUs comprising gNB-DUs 664a and 664b decide to switch to multi-cell coordinated transmissions using the same physical resource blocks. This switch causes significant interference to gNB-DU 682d engaging in only unicast transmissions with UE 616f.

In this exemplary scenario, following the switch from single cell Xcasting to multi-cell Xcasting for gNB-DUs 664a and 664b, gNB-CU 680 configures the establishment of a 'dummy' Xcast session 607 to gNB-DU 666. In the dummy Xcast session, gNB-CU 680 may signal the radio transmission parameters used by gNB-DUs 664a and 664b in order to facilitate interference cancellation at gNB-DU 666. In some examples, gNB-CU 608 may also signal, to gNB-DU 666, at least one data packet signalled by coordinated multi-cell Xcasting by RRH 682a, 682b and 682c. gNB-DU 666 can also be configured to schedule UE 616f in uplink for the interfered resources, in order to minimize UE impacts and to enable the operation of the optimized network.

In some examples, before allowing gNB-DUs 664a and 664b to switch to coordinated Xcast transmission mode, the gNB-CU can take the cost (in terms of interference to neighbouring DUs e.g. gNB-DU 666) and the benefits (in terms of spectral efficiency gains for the coordinating DUs 664a and 664b) into account.

Figure 7:
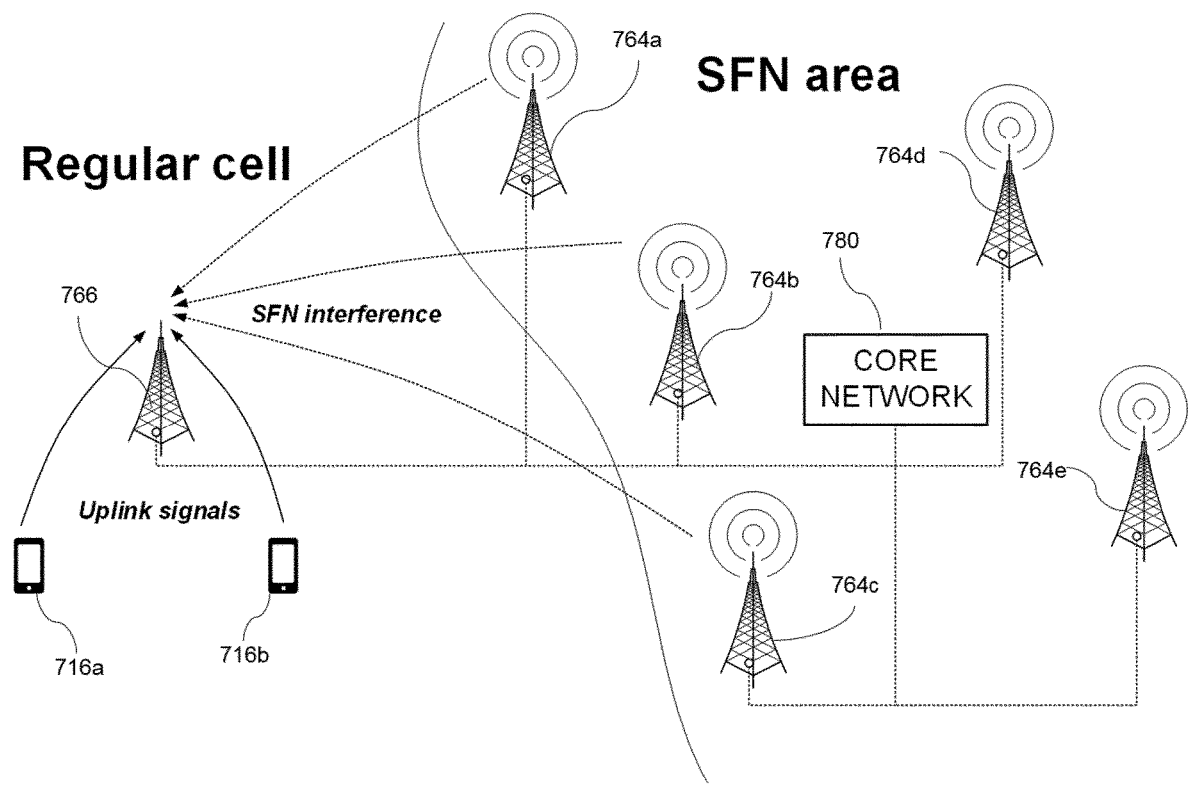
FIG. 7 shows a schematic representation of a network.

FIG. 7 shows a schematic example of a network.

A neighbouring cell comprises BS 766. UEs 716a and 716b transmit data in the uplink direction to BS 766. BS 766 is connected to core network 780. Core network 780 could correspond, for example, to AMF/SMF/MME and UPF for 5G/NR, and/or MME, MBMS-GW, BM-SC, P-GW and S-GW in 4G/LTE.

Core network 780 is also connected to BSs 764a, 764b, 764c, 764d, 764e and 764f. BSs 764a, 764b, 764c, 764d, 764e and 764f are performing multi-cell coordinated transmissions using the shared physical resource blocks such that they form a SFN.

The interference power experienced at BS 766 for an example set of parameters can be calculated.
Assuming that:
  the interfering SFN transmissions from the adjacent BSs 764a, 764b, 764c, 764d, 764e and 764f experience 100 dB of path loss (corresponding to roughly 500 m inter-site distance);
  the SFN BSs 764a, 764b, 764c, 764d, 764e and 764f use a fixed transmit power of 43 dBm; and
  there are three SFN-configured BSs (e.g. 764a, 764b and 764c) in the near vicinity;
  the interference power is given by $P_{IF}=10 \log_{10}(3)+43$ dBm$-100$ dB$=-52$ dBm. This interference can make it difficult to achieve meaningful capacity in the UL direction from UEs 716a and 716b to BS 766. Consequently, the SFN frequencies may not be able to be reused in the adjacent cells of BS 766 without interference cancellation.

To facilitate the reuse of SFN frequencies for UL communication a cell adjacent to a SFN area, such as the cell of BS 766, some examples use an interference cancellation algorithm for suppressing the SFN interference. In some examples, the interference cancellation can be performed in a similar manner as in inband full-duplex devices, for example. As long as the original interfering signal is known at BS 766, any existing cancellation algorithms to suppress the interference can be used at BS 766.

For example, if core network 780 provides the signal broadcast by BSs 764a, 764b, 764c, 764d, 764e and 764f to BS 766 over a backhaul connection, BS 766 can cancel the interference.

One method that can be used to cancel the interference is to use a least mean squares (LMS)-based algorithm. The use of a LMS-based algorithm may comprise the running of the following operations for each received waveform sample:

$$\hat{y}(n)=y(n)-h^H(n)x(n)$$

$$h(n+1)=h(n)+\mu\hat{y}^*(n)x(n),$$

where y(n) is the total received signal at the BS, containing the UL signals and the interference, x(n) is a vector containing the previous M samples of the interfering broadcast signal, h(n) is the M×1 channel estimate at the nth iteration, and μ is a learning parameter. In other words, the interference is cancelled by estimating the interference channel and using it to reconstruct the interfering signal. In some examples, a waveform sample may be provided to the digital baseband after analog-to-digital conversion by an output of an analog-to-digital converter of a radio receiver. In some examples, filtering may also be applied to the output of the analog-to-digital converter.

Depending on the scenario and the available computational resources, in some cases it might be more efficient to perform the interference cancellation in the frequency domain. The same principles can be also applied in the frequency domain although the final cancellation and learning rules may be different.

Figure 8:
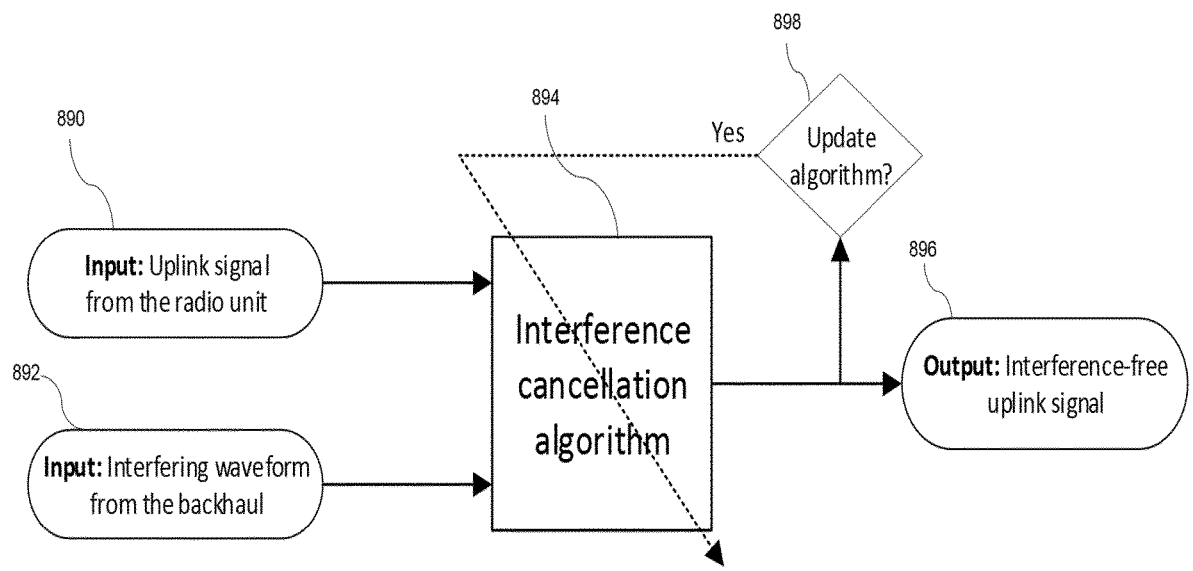
FIG. 8 shows an example processing flow.

FIG. 8 shows an example processing flow of a BS under SFN interference (a nBS), such as nBS 766, 666 or 466.

The two inputs into interference cancellation algorithm 894 are the uplink signal 890 from a radio unit received at the nBS from a radio unit and the known interference signal 892 from a set of BSs involved in multi-cell transmission multicast/broadcast traffic. In some examples, the radio unit is a UE.

The uplink signal 890 can be provided by the radio front-end of the nBS, and the signal 890 can be either the unprocessed time-domain waveform or the frequency-domain subcarriers contaminated (affected) by the interference.

The known interference signal 892 is the SFN signal obtained from a backhaul link, being delivered via the same interfaces and transport mechanisms as for the actual SFN nodes. nBS can then construct the waveform of the SFN signal using the provided SFN data and radio transmission parameters. These signals are then processed by the chosen interference cancellation algorithm 894. The interference cancellation algorithm 894 may be, for example, a classical LMS-type algorithm such as the LMS-based algorithm discussed above. In some examples, interference cancellation algorithm 894 may be a neural network-based solution. The output of the algorithm is the interference-free UL signal 896, in the same form as the input UL signal 890. The algorithm can also be updated based on the cancelled signal as shown at 898. The decision to update the cancellation coefficients can be made, for example, if the interference power is observed to be excessively high. In some examples, update 898 can be performed at certain fixed training times. In some examples, poor block error rate can also be used as a trigger to initiate the update 898.

Some examples improve spectral efficiency in a system, resulting in improved overall resource utilization. Some examples remove the need for guard cells in wide area broadcast network scenarios.

Figure 9:
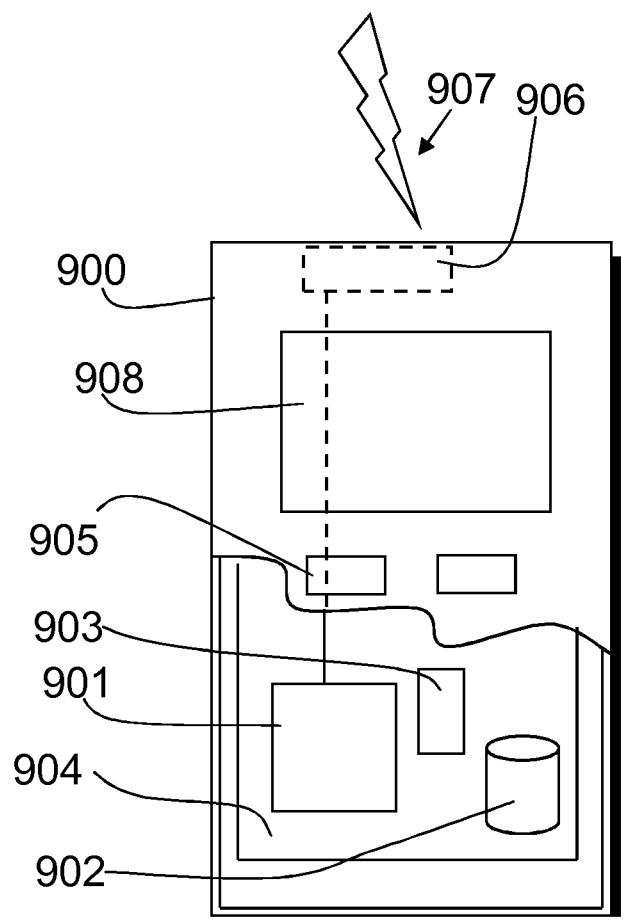
FIG. 9 shows schematic representation of an apparatus according to an example.

A possible wireless communication device will now be described in more detail with reference to FIG. 9 showing a schematic, partially sectioned view of a communication device 900. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 900 may receive signals over an air or radio interface 907 via appropriate apparatus for receiving and may transmit signals via appropriate apparatus for transmitting radio signals. In FIG. 9 transceiver apparatus is designated schematically by block 906. The transceiver apparatus 906 may be provided for example by means of a radio part and associated antenna arrangement. The antenna arrangement may be arranged internally or externally to the wireless device.

A wireless device is typically provided with at least one data processing entity 901, at least one memory 902 and other possible components 903 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 904. The user may control the operation of the wireless device by means of a suitable user interface such as key pad 905, voice commands, touch sensitive screen or pad, combinations thereof or the like. A display 908, a speaker and a microphone can be also provided. Furthermore, a wireless communication device may comprise appropriate connectors (either wired or wireless) to other devices and/or for connecting external accessories, for example hands-free equipment, thereto. The communication devices 902, 904, 905 may access the communication system based on various access techniques.

Figure 10:
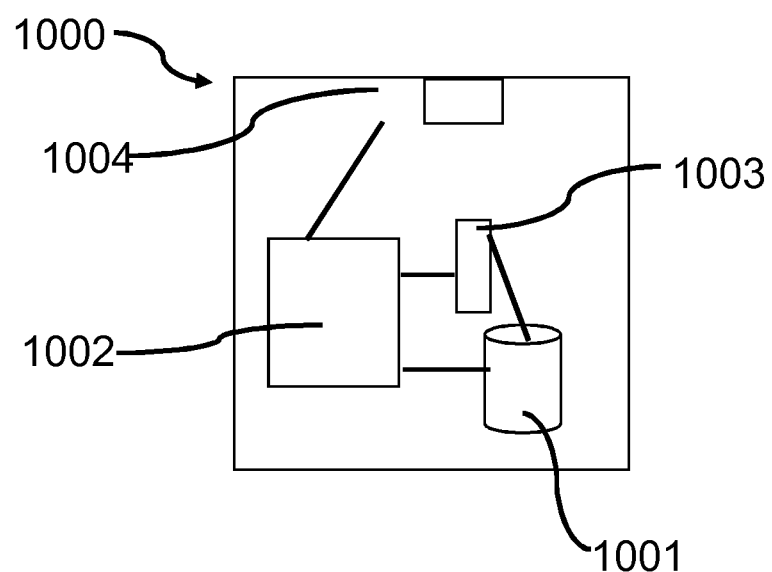
FIG. 10 shows a schematic representation of an apparatus according to an example.

FIG. 10 shows an example of a control apparatus for a communication system, for example to be coupled to and/or for controlling a station of an access system, such as a RAN node, e.g. a base station, gNB, a central unit of a cloud architecture or a node of a core network such as an MME, S-GW, or MCE a scheduling entity such as a spectrum management entity, or a server or host, or an IAB or relay node. The control apparatus may be integrated with or external to a node or module of a core network or RAN. In some example embodiments, base stations comprise a separate control apparatus unit or module. In other example embodiments, the control apparatus can be another network element such as a radio network controller or a spectrum controller. In some example embodiments, each base station may have such a control apparatus as well as a control apparatus being provided in a radio network controller. The control apparatus 1000 can be arranged to provide control on communications in the service area of the system. The control apparatus 1000 comprises at least one memory 1001, at least one data processing unit 1002, 1003 and an input/output interface 1004. Via the interface the control apparatus can be coupled to a receiver and a transmitter of the base station. The receiver and/or the transmitter may be implemented as a radio front end or a remote radio head. For example the control apparatus 1000 or processor 1001 can be configured to execute an appropriate software code to provide the control functions.

Figure 11:
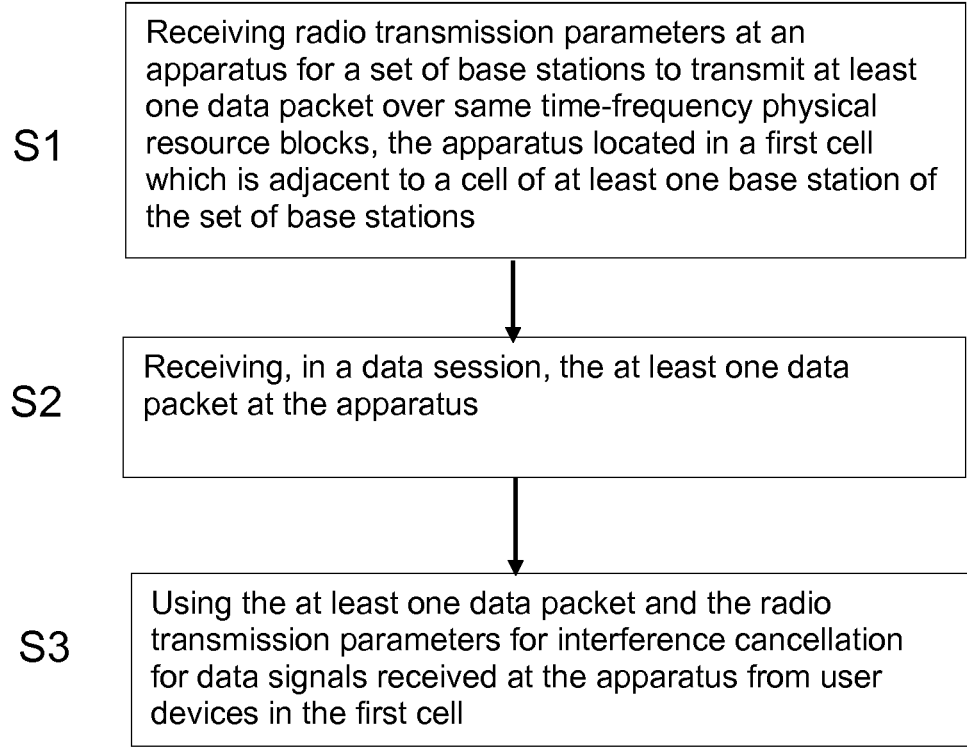
FIG. 11 shows a flow chart of a method according to an example.

FIG. 11 is a flow chart of a method according to an example. The flow chart of FIG. 11 is viewed from the perspective of an apparatus such as a base station (e.g. a gNB).

At S1, the method comprises receiving radio transmission parameters at an apparatus for a set of base stations to transmit at least one data packet over same time-frequency physical resource blocks, the apparatus located in a first cell which is adjacent to a cell of at least one base station of the set of base stations.

At S2, the method comprises receiving, in a data session, the at least one data packet at the apparatus.

At S3, the method comprises using the at least one data packet and the radio transmission parameters for interference cancellation for data signals received at the apparatus from user devices in the first cell.

Figure 12:
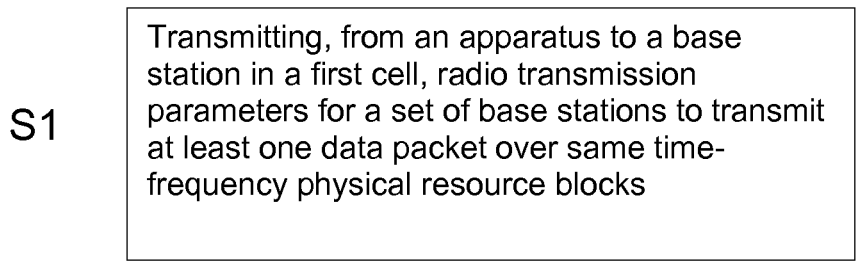
FIG. 12 shows a flow chart of a method according to an example.

FIG. 12 is a flow chart of a method according to an example. The flow chart of FIG. 12 is viewed from the perspective of an apparatus such as a base station (e.g. a gNB).

At S1, the method comprises transmitting, from an apparatus to a base station in a first cell, radio transmission parameters for a set of base stations to transmit at least one data packet over same time-frequency physical resource blocks. At least one base station of the set of base stations is situated in a cell adjacent to the first cell.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The example embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out example embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further exemplary embodiments comprising a combination of one or more exemplary embodiments with any of the other exemplary embodiments previously discussed.

The invention claimed is:

1. An apparatus comprising
at least one processor; and
at least one memory storing instructions that,
when executed by the at least one processor, cause the apparatus to-at least to:
  receive radio transmission parameters for a set of base stations to transmit at least one data packet over same time-frequency physical resource blocks, the apparatus located in a first cell which is adjacent to a cell of at least one base station of the set of base stations;
  receive, in a data session, the at least one data packet at the apparatus; and
  use the at least one data packet and the radio transmission parameters for interference cancellation for data signals received at the apparatus from at least one user device in the first cell.

2. An apparatus according to claim 1, wherein the instructions, when executed by the at least one processor, cause the apparatus to at least:
use the at least one data packet and the radio transmission parameters to reconstruct an interfering signal in the first cell, the interfering signal caused by the at least one data packet transmitted by each base station of the set of base stations over the same time-frequency physical resource blocks; and
use the reconstructed interfering signal for interference cancellation for the at least one data signal transmitted to the apparatus from the at least one user device in the first cell.

3. An apparatus according to claim 1, wherein the instructions, when executed by the at least one processor, cause the apparatus to at least:
send, to a core network entity, a request to initiate the data session when a triggering criteria has been met, wherein the triggering criteria comprises at least one of:
  a level of interference measured by at least one user device in the first cell exceeding a threshold level of interference; or
  a number of base stations in the set of base stations transmitting the at least one data packet over same time-frequency physical resource blocks exceeds a threshold number of base stations.

4. An apparatus according to claim 1, where receiving the at least one data packet and receiving the radio transmission parameters comprises at least one of:
receiving, in the data session, both the at least one data packet and the radio transmission parameters from a core network for managing setup of data sessions;
receiving, in the data session, the at least one data packet from the core network for managing setup of data sessions and receiving the radio transmission parameters from at least one base station of the set of base stations; or
receiving, in the data session, the at least one data packet from the core network for managing setup of data sessions and receiving the radio transmission parameters from a multi-cell multicast coordinate entity.

5. An apparatus according to claim 1, wherein the instructions, when executed by the at least one processor, cause the apparatus to at least:
configure, as uplink resources in the first cell, physical resource blocks which are experiencing interference due to the set of base stations which are transmitting the at least one data packet over same time-frequency physical resource blocks.

6. An apparatus according to claim 1, wherein the instructions, when executed by the at least one processor, cause the apparatus to at least:
terminate the data session at the apparatus.

7. An apparatus according to claim 1, wherein the instructions, when executed by the at least one processor, cause the apparatus to at least:
receive radio transmission parameters from a base station of the set of base stations via an X2 interface.

8. An apparatus comprising:
at least one processor; and
at least one memory storing instructions that,
when executed by the at least one processor, cause the apparatus to at least:
transmit, to a base station in a first cell, radio transmission parameters for a set of base stations to transmit at least one data packet over same time-frequency physical resource blocks;
wherein at least one base station of the set of base stations is situated in a cell adjacent to the first cell.

9. An apparatus according to claim 8, wherein the instructions, when executed by the at least one processor, cause the apparatus to at least:
receive, from the base station in the first cell, a request to transmit the radio transmission parameters when a triggering criteria has been met, wherein the triggering criteria comprises at least one of:
a level of interference measured by at least one user device in the first cell exceeding a threshold level of interference;
a number of base stations in the set of base stations transmitting data signals over same time-frequency physical resource blocks exceeds a threshold number of base stations; or
and in response to receiving the request, to cause transmitting, to the base station in the first cell, the radio transmission parameters.

10. An apparatus according to claim 8, wherein the apparatus is a part of a core network for managing setup of data sessions; and the instructions, when executed by the at least one processor, cause the apparatus to at least:
transmit, in a data session with the base station in the first cell, the at least one data packet; wherein transmitting the radio transmission parameters comprises transmitting the radio transmission parameters in the data session.

11. An apparatus according to claim 10, wherein the instructions, when executed by the at least one processor, cause the apparatus to at least:
receive a request to initiate the data session with the base station in the first cell when the triggering criteria have been met; and
initiate the data session with the base station in the first cell when the triggering criteria has been met.

12. An apparatus according to claim 8, wherein the at least one data packet and the radio transmission parameters of the set of base stations are configured to be used by the base station in the first cell to reconstruct an interfering signal in the first cell, the interfering signal caused by the at least one data packet transmitted by each base station of the set of base stations over the same time-frequency physical resource blocks.

13. An apparatus according to claim 8, wherein the instructions, when executed by the at least one processor, cause the apparatus to at least:
configure a data session with at least one base station of the set of base stations to configure the transmission of the at least one data packet over the same time-frequency physical resource blocks of the set of base stations.

14. An apparatus according to claim 8, wherein the instructions, when executed by the at least one processor, cause the apparatus to at least:
terminate the data session at the base station in the first cell.

15. A method comprising:
receiving radio transmission parameters at an apparatus for a set of base stations to transmit at least one data packet over same time-frequency physical resource blocks, the apparatus located in a first cell which is adjacent to a cell of at least one base station of the set of base stations; and
receiving, in a data session, the at least one data packet at the apparatus; and
using the at least one data packet and the radio transmission parameters for interference cancellation for data signals received at the apparatus from at least one user device in the first cell.

16. A method according to claim 15, wherein the using of the at least one data packet and the radio transmission parameters for interference cancellation comprises:
using the at least one data packet and the radio transmission parameters to reconstruct an interfering signal in the first cell, the interfering signal caused by the at least one data packet transmitted by each base station of the set of base stations over the same time-frequency physical resource blocks; and
using the reconstructed interfering signal for interference cancellation for the at least one data signal transmitted to the apparatus from the at least one user device in the first cell.

17. A method according to claim 15, wherein the method comprises the apparatus sending, to a core network entity, a request to initiate the data session when a triggering criteria has been met, wherein the triggering criteria comprises at least one of:
a level of interference measured by at least one user device in the first cell exceeding a threshold level of interference; or
a number of base stations in the set of base stations transmitting the at least one data packet over same time-frequency physical resource blocks exceeds a threshold number of base stations.

18. A method according to claim 15, wherein receiving the at least one data packet and receiving the radio transmission parameters comprises at least one of:
receiving, in the data session, both the at least one data packet and the radio transmission parameters from a core network for managing setup of data sessions;
receiving, in the data session, the at least one data packet from the core network for managing setup of data sessions and receiving the radio transmission parameters from at least one base station of the set of base stations; or
receiving, in the data session, the at least one data packet from the core network for managing setup of data sessions and receiving the radio transmission parameters from a multi-cell multicast coordinate entity.

19. A method according to claim 15, wherein the method comprises configuring, as uplink resources in the first cell, physical resource blocks which are experiencing interference due to the set of base stations which are transmitting the at least one data packet over same time-frequency physical resource blocks.

20. A method according to claim 15, wherein the method comprises terminating the data session at the apparatus.

\* \* \* \* \*